United States Patent [19]
Saari

[11] Patent Number: 5,338,202
[45] Date of Patent: Aug. 16, 1994

[54] DAILY DIET MANAGEMENT PLANNER AND METHOD

[76] Inventor: Michelle R. Saari, RR4 Box 152 A, Minot, N. Dak. 58701

[21] Appl. No.: 60,521

[22] Filed: May 13, 1993

[51] Int. Cl.⁵ ............................................. G09B 19/00
[52] U.S. Cl. .................................... 434/127; 434/238
[58] Field of Search ...................... 434/127, 238, 430; 40/124.2

[56] References Cited

U.S. PATENT DOCUMENTS

| | | | |
|---|---|---|---|
| 2,337,594 | 12/1943 | Easley. | |
| 2,768,452 | 10/1956 | Littlejohn | 434/127 |
| 3,491,715 | 1/1970 | Longarini. | |
| 4,310,316 | 1/1982 | Thomann | 434/127 |
| 4,312,393 | 1/1982 | Green | 40/124.2 X |
| 4,606,555 | 8/1986 | Adams | 283/52 |
| 4,650,218 | 3/1987 | Hawke | 283/67 |
| 4,652,241 | 3/1987 | McCarty | 434/127 |
| 4,828,498 | 5/1989 | Tilney | 434/127 |
| 4,832,603 | 5/1989 | Basil | 434/127 |
| 4,950,164 | 8/1990 | Lennon-Thompson et al. | 434/127 |
| 4,976,622 | 11/1990 | Clark | 434/127 |
| 4,979,901 | 12/1990 | Robertson et al. | 434/127 |

*Primary Examiner*—John G. Weiss
*Assistant Examiner*—Cindy A. Cherichetti
*Attorney, Agent, or Firm*—David A. Lingbeck

[57] ABSTRACT

This invention relates to a daily diet management planner and method comprising a foldable carrying case having a plurality of pockets and pocket inserts on and in the inside walls of the carrying case: having meal insert cards each identifying a specific meal type such as BREAKFAST, MORNING SNACK, LUNCH, AFTERNOON SNACK, DINNER, and BEDTIME SNACK; and having a plurality of food cards each listing one specific food within a food exchange and displaying a picture of either the approximate or visual serving size of the food. Prior to planning his/her diet, the user of the planner, who can be either an adult or a child, should consult a doctor or a dietitian for a prescribed diet which is then broken down and placed on each of the meal insert cards to balance the daily diet across all the meals for a day. The user selects food cards each listing one specific food and places them in pockets for the type of the meal. A child's daily diet management planner has cards having colorful animated pictures of the food portions on one side of thereof, which are used to measure, approximately or visually the size of the food allowed for a given meal. The preparer of the meal doesn't need to use scales or measuring devices to prepare the meal when using this daily diet management planner and method.

5 Claims, 2 Drawing Sheets

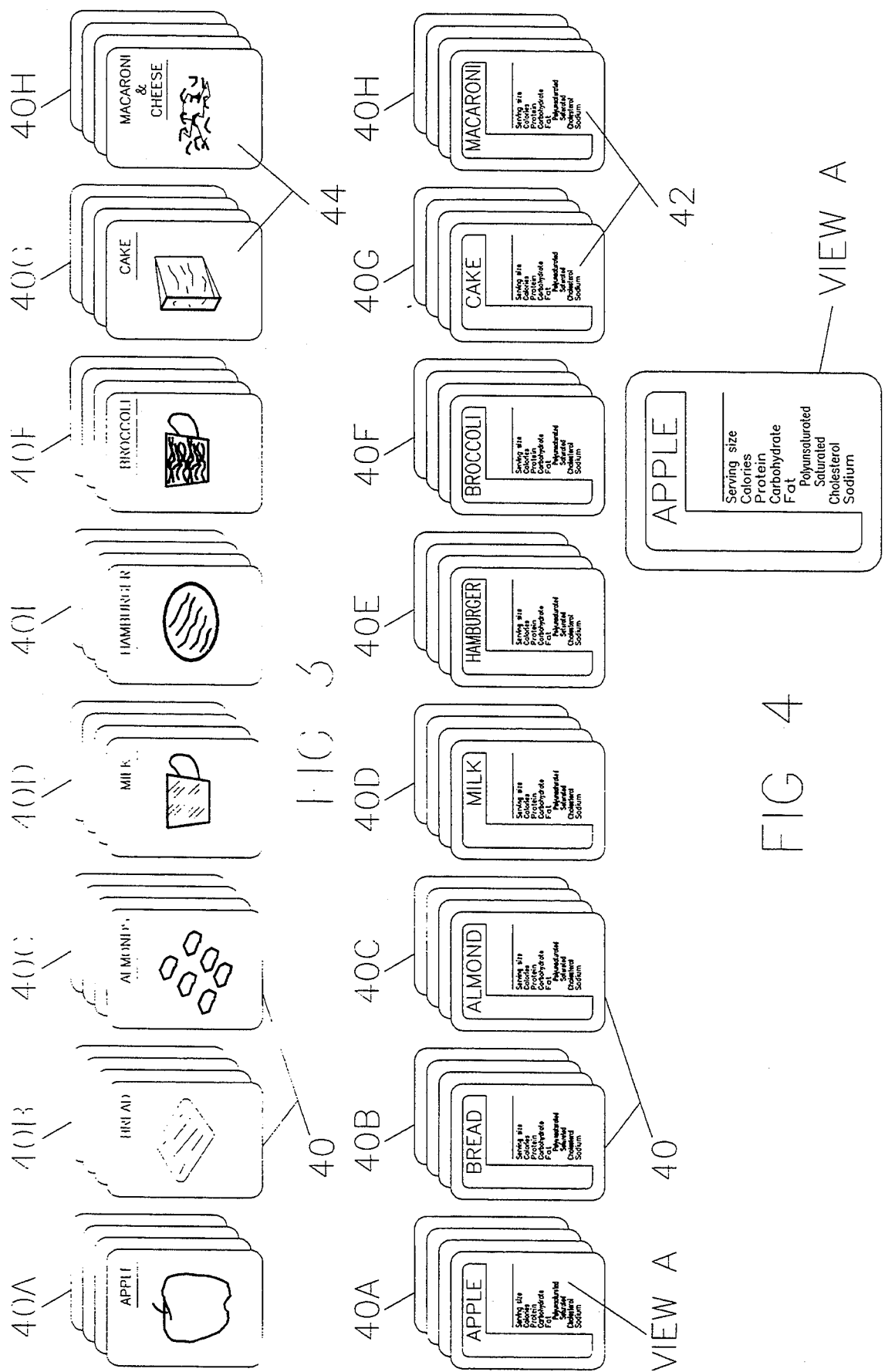

DAILY DIET MANAGEMENT PLANNER AND METHOD

BACKGROUND OF THE INVENTION

The present invention relates to a daily diet management planner and method designed to be conveniently used not only by adults but also by children to effectively manage their diets each day.

Dietary plans and methods are old in the art, but none of those plans and methods provides a universal measurement system on color-coded cards for the user to approximate, visually or otherwise, the portion or portions of the recommended daily allowance of the specific foods as does the present invention.

One known prior art is a DIABETIC DIET PLAN AID AND METHOD, U.S. Pat. No. 4,976,622 comprising a folder having a front cover and a back cover each having an inside surface and an outside surface. On the inside surfaces of both covers, pockets designating a meal and day are vertically arranged. The diabetic diet plan aid has a plurality of color cards of food groups with dietary information such as caloric content, fats, protein, and carbohydrates listed on one side of the cards. The diabetic diet plan aid permits the user to plan meals more than one day in advance and allows the user to insert the food group cards in the pockets designating the type of meal and the day. However, each card in the diabetic diet plan aid lists a number of specific food items and doesn't list only one specific food item as does the present invention. Further, the diabetic diet plan aid doesn't provide a universal measurement system to measure the recommended daily allowance of a specific food item as does the present invention.

Another known prior art is a PLANNING AND CONTROL SYSTEM FOR REGULATING FOOD CONSUMPTION, U.S. Pat. No. 4,652,241, comprising a plurality of independent, readily identifiable, movable members, each representing a pro-defined food group and portion and positionable with regards to meal designating zones for meals to be eaten in one day. The planning and control system for regulating food consumption allows the user to control and record the food consumed. As with the diabetic diet plan aid, the planning and control system for regulating food consumption list one specific food item per card and doesn't conveniently and effectively provide a universal visual measurement system by which the user can easily measure the amount of the specific food item allowed to be consumed as prescribed by the total number of calories the user can consume in any one day.

Another known prior art is a DIET CONTROL DEVICE AND METHOD, U.S. Pat. No. 4,606,555, comprising a booklet having a first cover and a second cover foldable relative to the first cover, and comprising a plurality of cards attached to one of the covers with each card being marked to represent a different day in the diet plan. Each of the cards in the Diet Control Device And Method includes a plurality of slits to form a plurality of individually removable and disposable tabs or splints. In use, one or more tabs are adapted to be removed from the booklet when the dieter has selected a particular food item within the diet plan.

Another known prior art is a DIET CONTROL APPARATUS, U.S. Pat. No. 4,310,316, comprising a plurality of individual containers corresponding to the number of meals to be eaten during a twenty-four hour period and having a plurality of tickets contained in the containers, which are redeemable for obtaining a quantity of specific food item within a food category and placed within a spent container for collection thereof.

Another known prior art is a METHOD AND APPARATUS FOR CONTROLLING CALORIC INTAKE, U.S. Pat. No. 4,650,218, comprising a food exchange list on individualized food counter tabs adapted to be removed from a food counter means to determine the caloric intake in a single day.

Other known prior art includes a MENU CARD DECK, U.S. Pat. No. 2,337,594, comprising a card deck having three or more cards, the first of said cards having an opening means, the second of said cards being disposable behind said first card and having a portion crossing and observable through said opening means, and the third of said cards disposable behind said second card and having a portion crossing and observable through both said opening means and said opening.

The prior art, METHOD AND APPARATUS FOR PLANNING AND CONTROLLING DIET, U.S. Pat. No. 4,979,901, comprises a planning board, a deck of meal menu cards,, and at least one daily totals strip. The planning board contains a plurality of columns representing days and each column has a plurality of spaces representing meals in a day. At one end of the column, there is a totals strip with information sections including indicia setting forth daily limits or goals for nutritional factors.

Another known prior art, FOOD EXCHANGES KIT, AND METHODS OF CONSTRUCTING AND UTILIZING SAME, U.S. Pat. No. 4,828,498, comprising color co-ordinated food exchange cards to match foods of the major food groups in a food exchange list. Self-adhesive labels printed with various meal designations are provided for affixing to the food exchange cards. The kit further comprises a third plurality of blank self-adhesive labels to be marked by the user with special instructions for application to certain ones of the first plurality of food exchange cards in accordance with the diet.

Another known prior art is a DIET PLANNING AND CONTROL SYSTEM AND METHOD, U.S. Pat. No. 4,950,164, comprising a plurality of sets of cards, the cards of each set having a common code, preferably a color code. Within each set there are a plurality of cards for each meal. The user can select on a given day a given color code set and can substitute freely to select any card within a meal group, and will be provided with information for complete meals on that day which satisfy the user's caloric intake levels.

Another known prior art is a MEAL SCHEDULING APPARATUS, U.S. Pat. No. 3,491,715 comprising a plurality of cards listing the ingredients, utensils required and preparation instructions for each course of a desired meal. The cards are arranged in a display device such that the timing indicia of the different cards are located for ready comparative examination and for initiating and completing the various processing steps for each course.

Yet, another known prior art is a TEACHING AID AND DAILY FOOD CONSUMPTION PLANNER, U.S. Pat. No. 4,832,603, comprising a display panel and a plurality of movable members mounted upon the display panel. The display panel has seven food group display zones across the top of the panel and six meal display zones across the bottom. Displayed on each of the movable members is a quantity and choice of food to make up one unit of food of a food group.

There is a need for a universal daily diet management planner and method which teaches children how to manage their diet and helps adults to easily and conveniently measure the portion or portions of a specific food without having to use various measuring utensils on hand, and which overcomes the problems of the prior art above-noted.

SUMMARY OF THE INVENTION

This invention relates to a daily diet management planner and method comprising a foldable case having a first and second main cover and two wing covers hingedly attached to the two main covers. The case also has a plurality of pockets arranged along the inside walls of the two main covers, and has a plurality of pockets extending laterally into and arranged longitudinally along the inside walls of the two wing covers and has a plurality of transparent holders fixedly attached on the walls of the wing covers, a transparent holder attached to and corresponding to a meal pocket and further attached below and near the opening to each meal pocket. Further, the daily diet management planner comprises six meal cards one for each of the six meals which are BREAKFAST, MORNING SNACK, LUNCH, AFTERNOON SNACK, DINNER, and BEDTIME SNACK; and comprises a plurality of varnished cards, approximately 250, dimensioned to fit in the pockets of the covers and wing covers. The front sides of the cards list the name of a food category, i.e., STARCH, FRUIT, MEAT, FAT, MILK, VEGETABLE, OCCASIONAL, and COMBINATION, the exchange value or specific food, the portion of the food allowed, and the carbohydrate, protein, fat (polyunsaturated and unsaturated), caloric, cholesterol, sodium, and fiber content. The back sides of the cards display a picture of either the approximate or visual serving size of the food exchange and is used to measure the amount of the food.

It is an object of this invention to produce a daily diet management planner and method which allows the user to become actively involved with setting up his/her diet plan for the day by allowing the user to pick the color-coded cards displaying the specific food exchange the user wants to consume for each of the six meals.

Another object of this invention is to produce a daily diet management planner and method which teaches the user the importance of managing his/her own diet by providing attractive color animated pictures of the specific food displayed on the one side of the cards with the dietary information prominently displayed on the other side of the cards.

Also, another object of this invention is to produce a daily diet management planner and method which displays the approximate or visual serving size of the specific food which can be used to approximate, visually or otherwise, the amount of the specific food allowed in the user's diet for that day.

Yet, another object of this invention is to produce a daily diet management planner and method which provides the user with a universal method for measuring the specific food without the user having to consult a conversion table or use a measuring device to measure the amount of the specific food allowed.

Further, another object of this invention is to produce a daily diet management planner and method which is fully self-contained and can be conveniently taken with the user anywhere without the user also having to pack or take along measuring devices of all kinds to measure the amount of the specific food allowed as prescribed by a physician or a dietitian and without the user having to use scales to weigh the food.

Further objects and advantages of the present invention will become apparent as the description proceeds and when taken in conjunction with the accompanying drawings wherein:

BRIEF DESCRIPTION OF THE DRAWINGS

FIG. 3 is a perspective view of the back side of the color-coded cards arranged in eight specific food exchanges comprising starch, fruit, fat, milk, meat, vegetable, occasional and combination illustrating a picture of the specific food on one side of the card and further illustrating the approximate or visual serving size of the food to he selected for any one meal.

FIG. 4 is a perspective view of the front side of the color-coded cards arranged in eight food exchanges showing the name of the specific food, the color of the food exchange, the exchange value including the portion or portions of the food allowed, the caloric content of the specific food, and the protein, carbohydrate, fat, cholesterol, sodium and fiber contents.

DETAILED DESCRIPTION OF THE INVENTION

Figure 1:
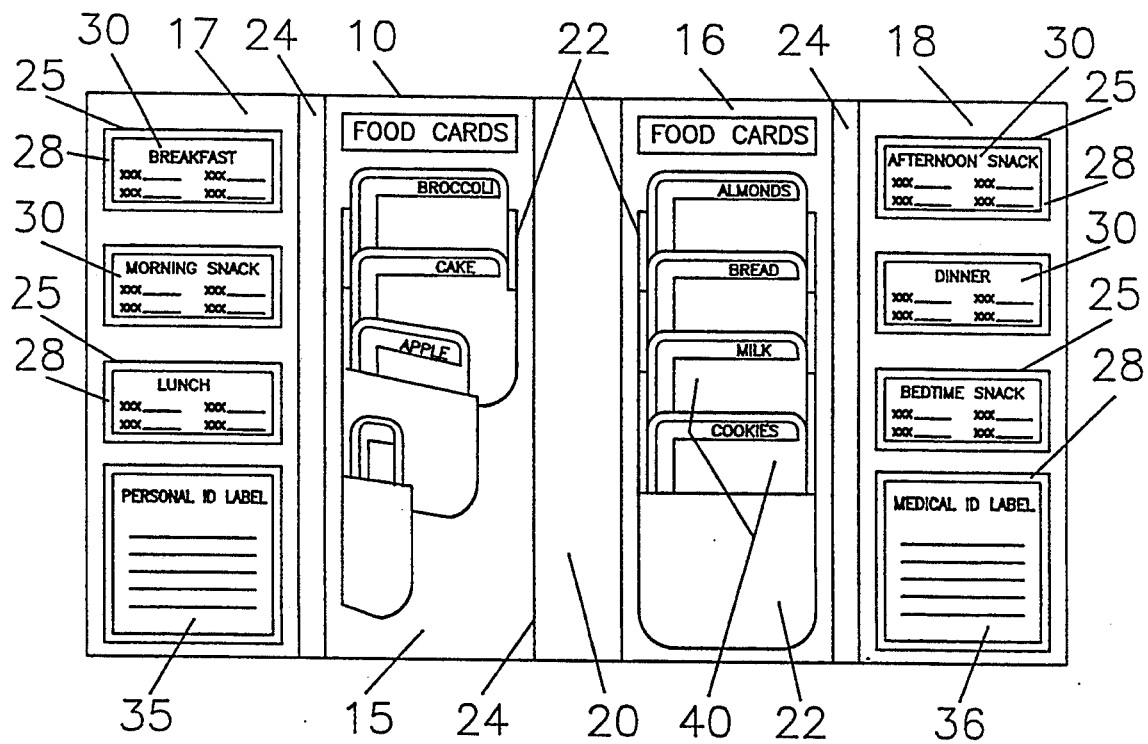
FIG. 1 is a front perspective view of the daily diet management planner opened to illustrate the arrangement of the pockets on the inside surface of the two wing covers and the back main cover for receiving color-coded cards displaying a specific food exchange and meal cards.
Figure 2:
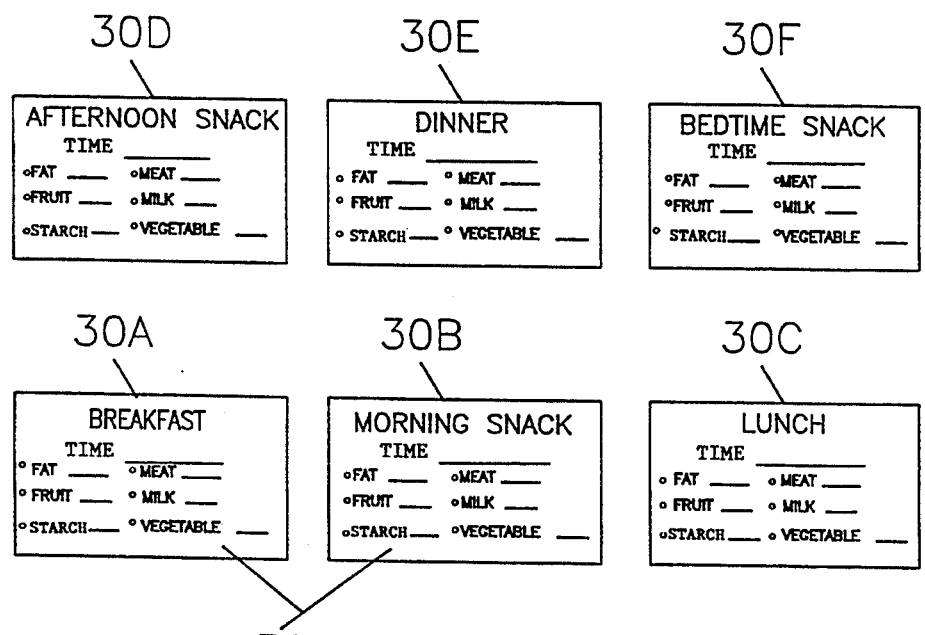
FIG. 2 is an front elevational view of the six meal cards showing the information contained on the cards.

Referring to the drawing in FIGS. 1, 2, and 3, the daily diet management planner and method comprises a foldable carrying case 10, preferably made of cardboard covered with a vinyl material, and having a first main cover 15, a second main cover 16 and a left and right wing covers 17 and 18. The first main cover 15 is hingedly connected at the side edge thereof to a side edge of the second main cover 16 by the vinyl material 24. One of the wing covers 17 is hingedly connected at a side edge thereof to a side edge of one of the main covers 15 by the vinyl material 24, and the other wing cover 18 is hingedly attached to the other main cover 16 by the vinyl material 24. The two main covers 15 and 16 and the two wing covers 17 and 18 each have an inside wall 20. On the inside wall 20 of each main cover 15 and 16, there are at least eight pockets 22 vertically arranged thereon with four pockets 22 vertically arranged on each main cover 15 and 16. The pockets 22 each have a side edge hingedly connected or sewed to near the side edge of the respective main cover to allow the user to turn the pockets 22 for convenient use thereof. Further, the foldable carrying case 10 comprises at least three meal pockets 25 longitudinally spaced apart in the inside wall 20 of each wing cover 17 and 18. Immediately below the opening to each of the meal pockets 25, there is a transparent holder 28 affixed to the wall 20 of each of the pockets 25 and each of the wing covers 17 and 18. Each of the transparent holders 28 corresponds to the meal pocket 25 to which it is affixed.

As shown in FIGS. 1 and 2, the daily diet management planner comprises preferably six meal cards 30 dimensioned to fit in the transparent holders 28 affixed to the wall 20 of the wing covers 17 and 18. Near the top of each of the meal cards 30, the name of a meal type is labeled. Each of the meal cards 30 have a different meal type labeled on one side and near the top thereof. As illustrated in FIG. 2, one of the cards 30a has the name "BREAKFAST" labeled near the top thereof; another card 30b has the name "MORNING SNACK"; another card 30c has the name "LUNCH"; another card 30d has the name "AFTERNOON SNACK"; another card 30e has the name "DINNER"; and the last card 30f has the name "BEDTIME SNACK" labeled near the top thereof.

As further illustrated in FIGS. 1 and 2, in addition to the name of the meal type, each of the meal cards 30 has the word "TIME" labeled immediately below the name of the meal with space provided following the word "TIME" for the user to fill in with the appropriate time as to when the meal is usually or should be taken. Further, on each of the meal cards 30, there is a list of six food exchanges with the color of the food exchange displayed immediately to the left of the name of the food exchange to quickly and effectively identify the food exchanges. After the name of each of the food exchanges, there is space provided for the user to check or enter a number to indicate the number of food portions in each food exchange allowed for each meal.

Further, as shown in FIG. 1, near the bottom of the left wing cover 17, a personal identification label 35 is detachably attached for the user to fill in his/her name, address, telephone number, and a legal guardian if there is one to identify the owner or user of that particular daily diet management planner and carrying case with cards should the user lose the planner and carrying case or for the possessor of the diet planner and case to match the diet planner and case with user thereof if the possessor has the responsibility of overseeing more than one diet planner and carrying case 10. As shown in FIG. 1, near the bottom of the right wing cover 18, a medical identification label 36 listing the name of the doctor of the user, the doctor's telephone number, and any emergency numbers the possessor of the daily diet management planner should be aware of and should call if an emergency arises for the user of the daily diet management planner, is affixed.

As shown in FIGS. 3 and 4, the daily diet management planner further comprises a plurality of varnished food cards 40, approximately 250, each having a front and back side 42 and 44. The front side 42 comprises a color strip extending along near the top edge and along near one side edge thereof, which identifies a specific food exchange. A different color represents a different food exchange. As a preferred embodiment, as shown in FIGS. 3 and 4, there are eight food exchanges, which are named FRUIT, MEAT, FAT, STARCH, VEGETABLE, MILK, OCCASIONAL, and COMBINATION. The food cards 40 of a particular food exchange, having the same strip of color are grouped together and placed in a pocket 22 on one of the main covers separate and distinct from the food cards 40 of the other food exchanges.

As shown in FIG. 4, near the top edge of each food card 40 on the front side 42 thereof, in hold print on the color strip, the name of the specific food is displayed. Below the name of the specific food, the name of the food exchange in which the specific food belongs is displayed, and beneath the name of the food exchange, reference is made as to how the specific food should be prepared (i.e., raw or cooked), and reference is also made as to the portion or size of the specific food the user is allowed to eat in the preparation indicated. On each food card 40, the serving size for that specific food is listed along with the caloric content for that serving size and the grams of carbohydrate, fat (polyunsaturated and saturated), cholesterol, sodium, and fiber.

FIG. 4 shows the preferred front sides 42 of the food cards 40 of the eight food exchanges. As shown in FIG. 4, the food card 40b listing the food BREAD states that the allowed serving size is one slice of bread, and has a strip of color uniquely identifying the "STARCH" food exchange to which the specific food BREAD belongs. The food card 40c listing the specific food ALMONDS states that the allowed serving size is six almonds, and has a color code uniquely identifying the "FAT" food exchange to which the specific food ALMONDS belongs. The food card 40e listing the specific food HAMBURGER indicates an allowed serving size of one ounce, and has a color code uniquely identifying the "MEAT" food exchange. The food card 40d listing MILK lists an allowed serving size of one cup, and has a color code uniquely identifying the "MILK" food exchange. The food card 40f listing BROCCOLI lists an allowed serving size of one half cup if served cooked or one cup if served raw, and identifies the "VEGETABLE" food exchange. The food card 40g listing ANGEL FOOD CAKE lists an allowed serving size of one slice and and identifies the "OCCASIONAL" food exchange to which ANGEL FOOD CAKE belongs. The food card 40a listing APPLE lists a serving size of one apple and displays the name "FRUIT" for the food exchange of APPLE. The food card 40h listing MACARONI & CHEESE lists an allowed serving size of one cup and displays the name "COMBINATION" for the food exchange. Each of the food exchanges has its own unique color code so that the user when selecting specific food cards 40 each listing a specific food, can quickly identify the food exchange of each particular food without having to read the food card 40 and allows the user to quickly select food cards 40 from each food exchange to balance and plan his/her diet. There are approximately 250 food cards 40 in this daily diet management planner. However, this number is not absolute as the makeup of the daily diet management planner changes as the needs of the users change.

FIG. 3 illustrates the preferred back sides 44 of the food cards 40. Near the top right corner of each food card 40 on the back side 44 thereof, the name of the specific food is labeled in bold, easily readable print. Below the name and occupying much of the surface of the back sides 44 of the food cards 40, either the approximate or visual sizes of the specific food portions allowed are displayed. Not all of the food cards 40 are able to display a picture of the approximate size of the specific food listed on each of the food cards, because the cards 40 are dimensioned to fit in the pockets 22 or meal pockets 25 on the two main covers 15 and 16 and in the two wing covers 17 and 18 and the approximate serving size or easily quantifiable portion of the serving size of the food may be larger than the surface space on the food card 40. For those food cards 40, the visual serving size of the food is displayed rather than the approximate serving size or easily quantifiable portion of the serving size. As shown in FIG. 3, the preferred back side 44 of the food card 40b of BREAD shows a picture of a slice of BREAD, which visually represents a serving size of the BREAD instead of the approximate size of the BREAD, because the approximate serving size of a slice of BREAD is larger than the surface of the dimensioned food card 40. The food card 40c of ALMONDS shows a picture of six almonds, which are of approximate serving size. The food card 40d of MILK shows a picture of an approximate-sized cup filled with milk to approximate the serving size or quantifiable portion of the serving size. The food card 40e listing HAMBURGER shows a picture of cooked particulate hamburger of approximately 1 ounce, which is the approximate serving size. The food card 40f listing BROCCOLI shows a picture of a cup half filled with raw BROCCOLI, which is the approximate serving size or a quantifiable portion of the serving size. The food card 40g listing ANGEL FOOD CAKE displays a picture of a slice of angel food cake, which is the approximate serving size. The food card 40h displaying a picture of MACARONI & CHEESE shows a picture of a transparent cup filled with MACARONI & CHEESE, which is the approximate serving size or a quantifiable portion of the serving size. The food card 40a of APPLE displays a picture of an APPLE on the back side 44 of the card 40, which is the approximate serving size. If a picture of the approximate serving size or a quantifiable portion of the serving size of the food can be displayed on the back side 44 of the food card 40, then a picture of that food will be displayed on the card 40 in the serving size allowed. Otherwise, only a visual representation of the food will be displayed on the back side 44 of the food card 40 to illustrate for the user the serving size of that specific food.

In use of the daily diet management planner and method, the user should combine all the food cards 40 of a food exchange into one pocket 22 on one of the main covers 15 and 16, separate from the food cards 40 of all the other food exchanges, which should be placed in their respective pockets 22. Preferably, prior to using this daily diet management planner and method, the user should consult a doctor for a diet prescription containing a specific total number of daily calories or for referral to a registered dietitian for such diet prescription. The registered dietitian distributes the prescribed diet in food exchanges which can be selected for the various meal types. The method of managing the prescribed diet begins by breaking down the diet into the food exchanges to evenly distribute a well-balanced diet among the six meals in a day, which are BREAKFAST, MORNING SNACK, LUNCH, AFTERNOON SNACK, DINNER, AND BEDTIME SNACK. The user preferably sets up his/her meal by transferring the prescribed diet to the meal cards 30. The user should indicate on the meal cards 30 with a mark or otherwise, the food exchanges allowed for that meal and preferably the number of food cards 40 from each food exchange allowed for that meal. After this information is transferred to the meal cards 30, the user should insert the meal cards 30 into the transparent holders 28 of the two wing covers 17 and 18 in the order of the meal served, preferably from left to right and top to bottom with the BREAKFAST meal card 30a placed in the uppermost left transparent holder 28 on the left wing cover 17 and the BEDTIME SNACK meal card 30f placed in the lowermost right transparent holder 28 of the right wing cover 18. The user should then decide upon which of the specific food portions he/she wants to consume from the food exchanges allowed for each of the meals and should select the food cards 40 of those specific food portions from the pockets 22 on the main covers 15 and 16. The food cards 40 are color-coded to allow the user to effectively and conveniently select the food cards 40 from the appropriate food exchanges without having to read all the information on every food card 40 and to allow the user to group together all the food cards 40 of one food exchange to maintain continued effective use of this daily diet management planner. Different daily diet management planners are developed for the adult user and the child user. To appeal to the child user so that the child is motivated and encouraged to become involved in managing his/her own diet and to learn the correct diet to maintain good health, the food cards 40 in a child daily diet management planner have colorful, animated pictures of the specific food portions on the food cards 40. The food cards 40 as selected by either the child user or the adult user are to be removed from the pockets 22 of the main covers 15 and 16 and inserted in the appropriate meal pockets 25 in the wing covers 17 and 18. Food cards 40 selected for a particular meal are placed in the meal pocket 25 in the wing cover 17 and 18 corresponding to the meal identified by the meal card 30 inserted in the holder 28 affixed to the wall 20 of the meal pocket 25 directly below the opening to the meal pocket To prepare the food portions listed on the food Cards 40, the preparer removes each card 40 from the meal pocket 25 and uses the picture of the specific food on the card 40 to either approximately measure the food or visually measure the food allowed to be served to the user of the diet management planner, and prepares the amount of the food from the picture of the food on the food card 40 to approximately or visually measure the size of the food serving for that food. The daily diet management planner eliminates the use of scales or other measuring devices to prepare the portion or portions of the food allowed as indicated on the food card and prescribed by a knowledgeable professional. Each of the food portions listed on the food cards 40 can be prepared without a scale or measuring device as such, and is efficient and effective for people responsible for diabetic children as such, like daycare providers or babysitters, without their having to learn very much about the diet of the child diabetic as such. After the food preparer finishes preparing each food, the food card 40 should be placed back in the meal pocket 25 of the appropriate meal type.

Once the meal has been served and consumed, the user can either remove the food cards 40 from the respective meal pocket 25 and place the cards 40 in the appropriate pockets 22 on the main covers 15 and 16 or leave the cards 40 in the meal pocket 25 if he/she desires to consume the same food portions the next day. If the user chooses the former, the user will preferably repeat the method of selecting the food cards 40 from the pockets 22 on the main covers 15 and 16 and preparing the food portions for each of the meals by using the pictures of the food portions on the food cards 40 to measure the serving sizes of the food portions for the prescribed diet.

The carrying case 10 of the daily diet management planner is easily foldable by folding the wing covers 17 and 18 over the main covers 15 and ! 6 and folding the main covers 15 and 16 over each other, and can be easily carried and stored in an easily accessible place such as a drawer or shelf or the like for later use when needed to either plan a meal or prepare a meal. The food cards 40 and the meal cards 30 can be stored in the pockets 22 of the carrying case 10 so that the cards don't get lost.

It will he obvious that various changes and departures may be made to the invention without departing from the spirit and scope thereof. Accordingly, it is not intended that the invention he limited to that specifically described in the specification or as illustrated in the drawing but only as set forth in the claims.

What is claimed is:

1. A daily diet management planner comprising:
    a foldable carrying case having at least one main cover and at least one wine cover foldable relative to said main cover, each of said covers having an inside wall with a plurality of pockets in spaced relationship thereupon, each wing cover further having meal card holders attached to and corresponding to said pockets thereupon;
    a plurality of meal cards dimensioned to fit into said meal card holders and removably inserted in said holders; and.
    a plurality of food cards having two sides and dimensioned to fit into said pockets of said covers, each said food card identifying one specific food, said food cards insertable and storable in said pockets of each said main cover and insertable in said pockets corresponding to meal types, each said food cards being color coded on at least one side hereof to identify a specific food exchange, each of said food cards further providing information as to serving size and preparation of said food and providing a picture of either an approximate size or visual size of said food for a user to conveniently and effectively measure an amount of said food allowed for a particular meal.

2. A daily diet management planner comprising:
    a foldable carrying case having at least one main cover and at least one wing cover foldable relative to said main cover, each of said covers having an inside wall with a plurality of pockets in spaced relationship thereupon, each wing cover further having meal card holders attached to and corresponding to said pockets thereupon;
    a plurality of meal cards dimensioned to fit into said meal card holders and removably inserted in said holders; and
    a plurality of food cards having two sides and dimensioned to fit into said pockets of said covers, each said food card identifying one specific food, said food cards insertable and storable in said pockets of each said main cover and insertable in said pockets corresponding to meal types, each said food cards being color coded on at least one side thereof to identify a specific food exchange, each of said food cards further providing information as to serving size and preparation of said food and providing a colorful, animated picture of either an approximate size or visual size of said food allowed for a particular meal to effectively encourage users to actively manage and learn about their own diets.

3. A daily diet management method comprising the steps of:
    providing a foldable carrying case having at least one main cover and at least one wing cover foldable relative to each said main cover, said covers having a plurality of pockets, each said wing cover having meal card holders each being attached upon and corresponding to a pocket on each of said wing cover;
    providing a plurality of food cards dimensioned to fit into said pockets and each providing a name of one specific food and
    providing a picture of an approximate serving size or visual size of said food, said food cards insertable in said pockets of each said main cover and each said food cards color coded to identify a particular food exchange and combinable with food cards of the same food exchange in said pockets on said main cover;
    providing a plurality of meal cards each describing an exclusive meal type and dimensioned to fit into said holders;
    planning a daily diet;
    transferring said diet plan to said meal cards;
    inserting said meal cards in said holders;
    selecting said food cards from said pockets on each said main cover for a particular meal according to said meal plan:
    inserting said food cards in said pockets in said wing cover for said meals; and
    preparing said food portions for a meal using said food cards.

4. A daily diet management method according to claim 3, which further includes the step of applying said pictures of said food portions provided on said selected food cards to visually or approximately measure the serving size or a quantifiable portion of the serving size of said food portions for said diet.

5. A daily diet management method according to claim 3, which further includes the step of measuring the serving size or a quantifiable portion of the serving size of each food with the picture of said food provided on said food card.

* * * * *